May 1, 1951  M. C. SUPITILOV ET AL  2,551,350
ELECTRICAL APPARATUS

Filed May 23, 1947  3 Sheets-Sheet 1

INVENTORS:
MICHAEL C. SUPITILOV.
ROBERT H. LARSON.
BY Robert L. Kahn
ATTORNEY.

May 1, 1951　　M. C. SUPITILOV ET AL　　2,551,350
ELECTRICAL APPARATUS
Filed May 23, 1947　　3 Sheets-Sheet 2
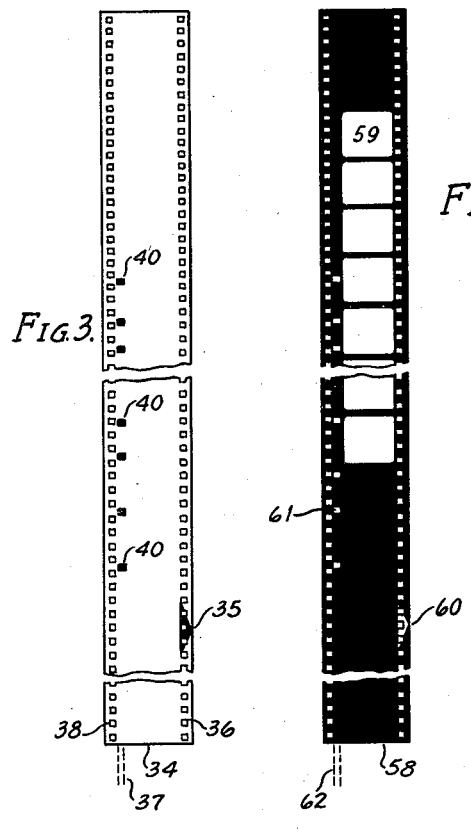
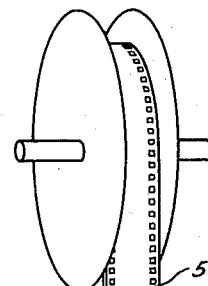
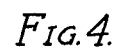
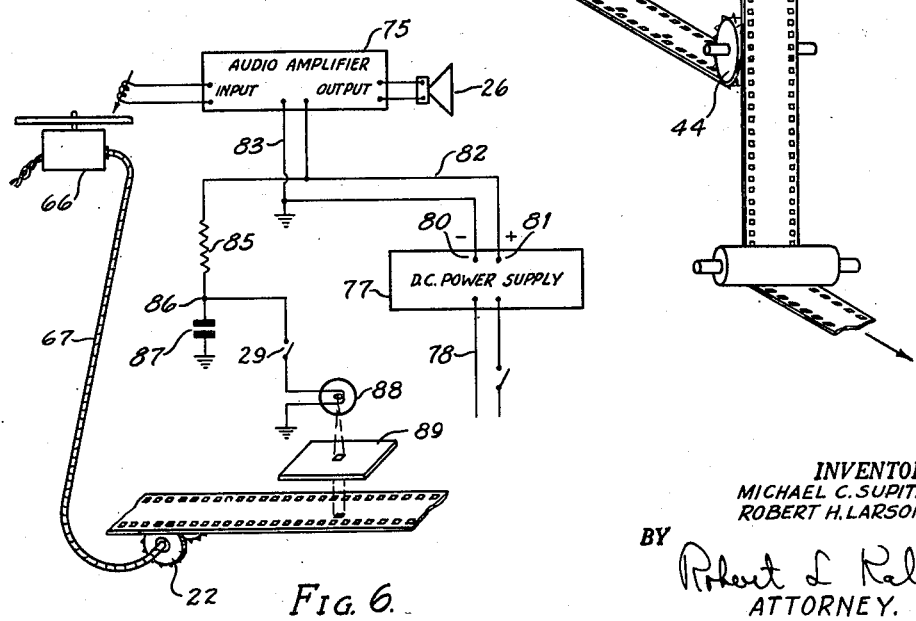
INVENTORS:
MICHAEL C. SUPITILOV.
ROBERT H. LARSON.
BY Robert L. Kahn
ATTORNEY.

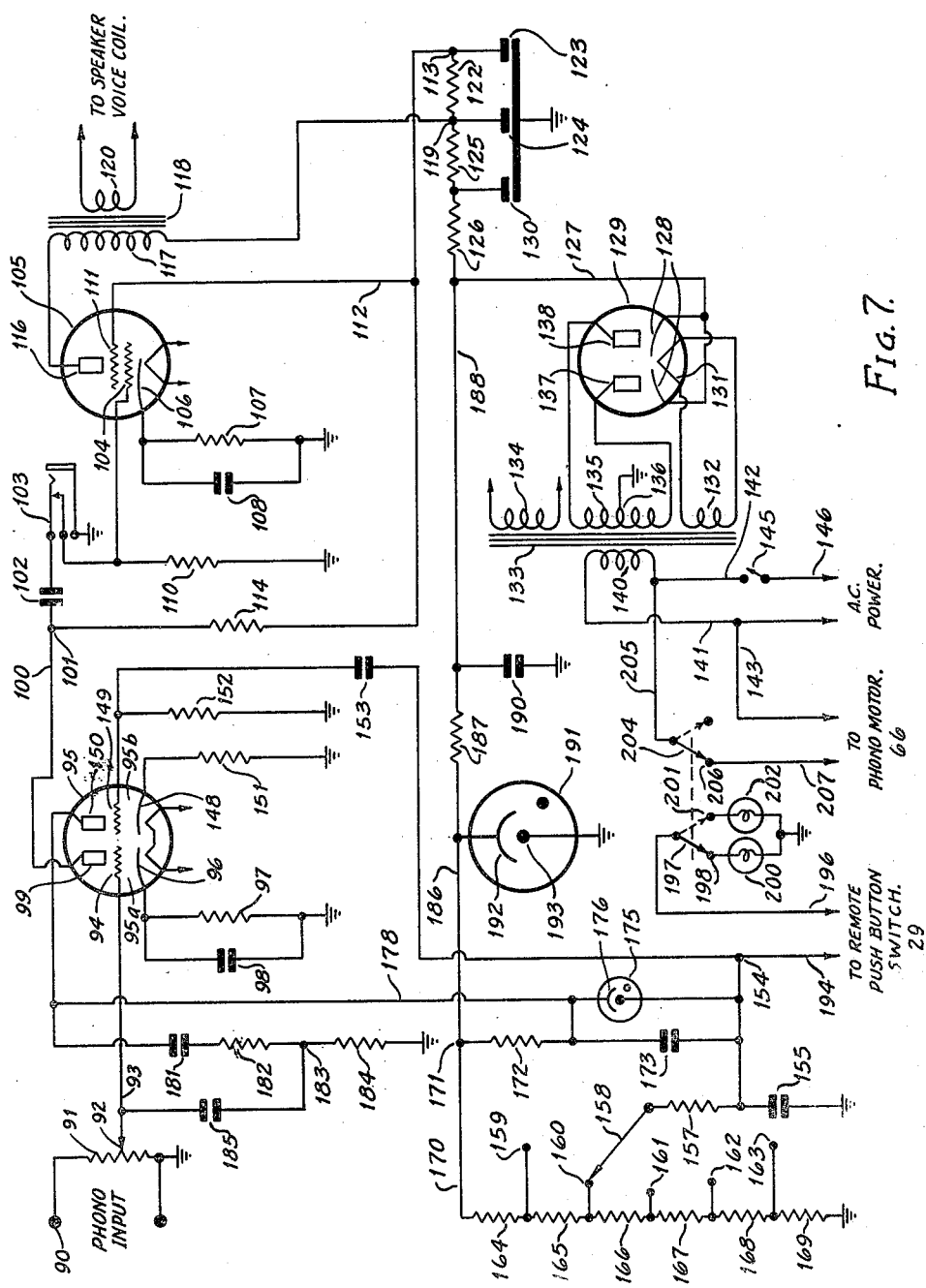

Patented May 1, 1951

2,551,350

UNITED STATES PATENT OFFICE 2,551,350

ELECTRICAL APPARATUS

Michael C. Supitilov, St. Charles, and Robert H. Larson, Batavia, Ill., assignors to Operadio Manufacturing Co., St. Charles, Ill., a corporation of Illinois Application May 23, 1947, Serial No. 749,936

7 Claims. (Cl. 179—100.3)

This invention relates to an electrical apparatus and particularly to an apparatus for providing control deformations in a control track in a picture film for use in connection with synchronized sound and irregularly intermittent picture projection. In the copending application of Michael C. Supitilov, Ser. No. 653,501, filed March 11, 1946, a synchronized sound reproducing and picture projection system is disclosed and claimed. In this application, a conventional length of strip film is used for intermittent picture projection. In addition to picture frames which are to be projected at irregular times during sound reproduction, a control track on said film is provided. The control track provides for film deformations spaced at suitable intervals along the length of film. As disclosed in said application, a portion of the film is continuously and synchronously advanced with a sound record during reproduction. The synchronized portion of the film is spaced from the frame being projected at that particular time. The continuous and synchronized movement of film bearing the control track past a control point makes it possible to provide for governing the duration of projection of a corresponding picture frame.

The invention hereinafter disclosed and claimed provides an apparatus whereby film deformations may be applied on a control track. While the system disclosed herein is specifically designed for providing film deformations by photographic means, it will be understood that other deformations, such as slits in film or magnetized portions of a control track, may be similarly provided.

The invention, in general, provides apparatus whereby a sound record to be used in conjunction with a strip film is matched thereto. Simultaneously with sound reproduction, film having a blank control track is moved past a deforming region in synchronism with sound record movement. An operator familiar with desired synchronization of sound record and picture frames has control means for creating film deformations at spaced points along the film during record reproduction.

Figure 1:
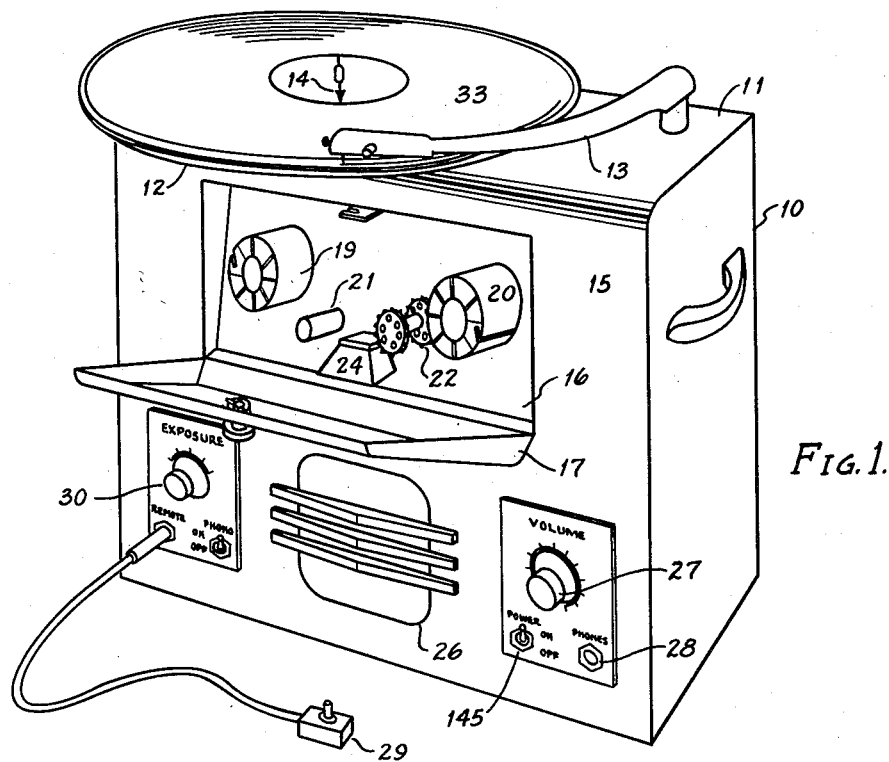
Figure 2:
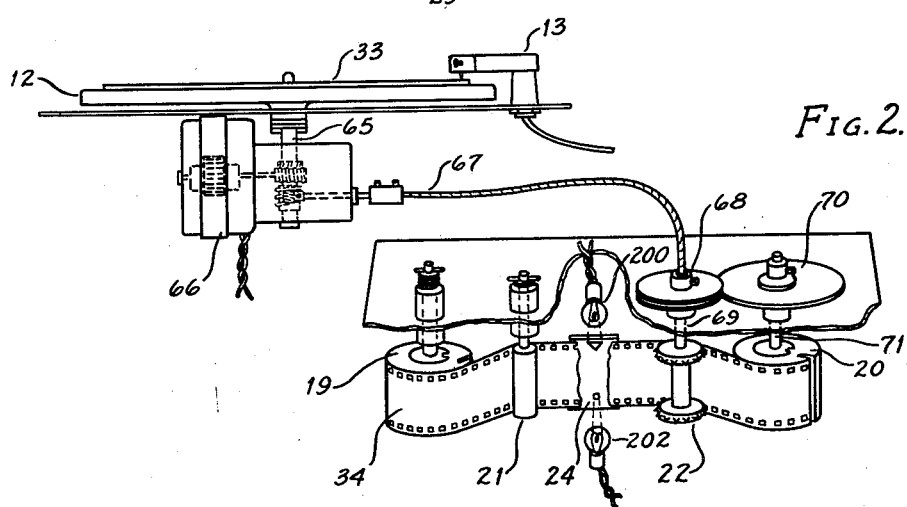

For a complete description of the invention, reference will now be made to the drawings wherein Figure 1 is a perspective view of a complete apparatus embodying the invention. Figure 2 is a phantom view, partly diagrammatic, of certain portions of the apparatus. Figure 3 is a detail of a developed film after being processed by the apparatus shown in Figure 1. Figure 4 is a perspective diagrammatic view of a system for combining the film shown in Figure 3 with a conventional strip film. Figure 5 is a detail of a film having mixed therein in proper relation a strip film of pictures and film containing control track deformations. Figure 6 is a simplified diagrammatic showing of the electrical system of the apparatus shown in Figure 1. Figure 7 is a circuit diagram in detail of the electrical portion of the system shown in Figure 1.

Referring first to Figure 1, the apparatus comprises case 10 having top panel 11 upon which are mounted in cooperating relation phonograph turntable 12 and phonograph pick-up arm 13 equipped with conventional pick-up and stylus. Case 10 has front panel 15 containing light-tight compartment 16, access to which may be obtained by hinged door 17. Disposed in compartment 16 are spaced reels 19 and 20. Idler 21 and sprocket 22 cooperate to move film past gate 24.

As will be explained in detail later, sprocket 22 is driven in synchronism with turntable 12 so that the film passes gate 24 in timed relation to turntable movement.

Case 10 carries speaker 26, this speaker being fed by a suitable amplifier so that reproduction of sound records on turntable 12 may be provided. The volume of reproduction of speaker 26 may be controlled by knob 27. Jack 28 for head phones or remote speaker is provided.

Film deformations, such as by momentary flashes of light on unexposed film in the control track, may be provided at suitable times during sound reproduction. Such means for generating film deformations may include switch 29 and control knob 30. Thus, in order to use the apparatus, record 33 is disposed on turntable 12. For accurate timing, it is preferred to provide record 33 with some indicia such as an arrow 14 to show the starting point for reproduction. It is understood that the needle of the pickup carried by tone arm 13 will be placed upon the outermost groove of the record. Film 34 in strip form is provided for cooperation with sprocket 22. This film may be the same type of film as used in connection with projection although this is not essential and may, for example, consist of 35 millimeter film having sprocket holes along the two sides. It is understood, however, that this is merely exemplary, and other kinds of film may be used.

Film 34 is provided by the apparatus here disclosed with starting deformation 35 corresponding to the starting position of the stylus on record 33. Deformation 35 may assume any form and here consists simply of an arrow-head of exposed film against a background of blank film.

Mark 35 may be positioned along any desired transverse portion of the film. As shown here, starting deformation 35 is disposed along one series 36 of sprocket holes. Control track 37 adjacent other series 38 of sprocket holes may be used for controlling the projection time of individual frames. Control track 37 has deformations 40 at irregular intervals along the length thereof, thei ntervals corresponding in time to the duration of exposure of corresponding picture frames. Thus, for each particular picture frame to be exposed, a particular deformation is provided, this deformation determining the beginning of exposure time for the corresponding picture frame, the exposure time being terminated by a succeeding deformation. The deformations here consist simply of exposed spots along blank control track 37.

Film strip 34 shown in Figure 3 only carries control deformations, and the control track with its deformations must be combined with suitable picture frames for use in projection. Thus, referring to Figure 4, a simple means is shown for printing a combined picture and control track film. Referring to this figure, film 34 with its control track is moved by sprocket 44 beyond gate 46. Picture film 50 having frames 51 for projection is moved by sprocket 53 beyond gate 54. It is understood that gate 46 is so constructed as to cooperate with control track 37 and the other edge portion of the film containing sprocket holes 36. Similarly, gate 54 is so constructed as to cooperate with the picture frame track.

Superimposed upon film 34 and picture film 50 is blank film 56, also moved by sprockets 44 and 53 respectively, both sprockets turning equally. Film 56 has picture frames printed thereon at gate 54 and has control film deformations printed at gate 46. Thus, film 56, after passing the two gates and being exposed, will have a composite of control track deformations and picture frames thereon. For proper positioning of the deformations with respect to film frames on the composite film, it is essential that film 34 and film 50 be so positioned that a control deformation has the desired offset, along the film length, with respect to its corresponding picture frame.

The resulting film, when developed, may be the final strip or master strip 58 containing picture frames 59, starting deformation 60 and control deformations 61, the latter lying along control track 62. As shown in Figure 5, the film is exposed along the sides adjacent the sprocket holes to provide a dark background with transparent deformations. This, however, may be reversed if desired. It is evident that, if strip 58 is to be regarded as a master strip, it may be handled in a conventional manner for duplication and the prints may be either positive or negative.

Referring now in detail to the mechanism, turntable 12 is carried on spindle 65 geared to motor 66. Motor 66 is preferably of the type used in phonograph work providing a constant speed. Motor 66 also drives flexible shaft 67 at any desired speed with relation to spindle 65. Flexible shaft 67 drives friction discs 68 carried on shaft 69 for sprockets 22. Friction discs 68 engage disc 70 on shaft 71 driving take-up reel 20. Supply reel 19 and idler 21 are both mounted in any desired fashion.

Referring to Figure 6, a simplified electrical system is shown. Thus, the output of the phonograph pick-up is fed to audio frequency amplifier 75, and the amplified output is fed to speaker 26. The audio frequency amplifier includes vacuum tubes requiring rectified high potential. To this end, power supply 77 energized from any power source, such as the conventional 110 volt, 60 cycle line 78, may be relied upon. Power supply 77 has terminal 80 connected to the apparatus ground, and remaining terminal 81 connected by lead 82 to audio frequency amplifier 75. The amplifier is grounded by lead 83.

The high potential direct current from power supply 77 may also be utilized in connection with the generation of film deformations. To this end, line 82 is connected through resistor 85 to junction 86. Junction 86 has grounded condenser 87 connected thereto. Junction 86 is also connected through manual switch 29 to grounded lamp 88. Lamp 88 cooperates wtih gate or lens system 89 for providing a fine beam of light on control track 37 of film 34. Lamp 88 may be of the incandescent filament type.

It is evident that, upon closure of switch 29, lamp 88 will carry discharge current from condenser 87. By suitable choice of condenser and lamp, an intense highly actinic flash from lamp 88 may be provided for exposing a film spot. Suitable resistance may be included in series with the lamp to control the discharge current as well as time of discharge. Resistor 85 preferably has such a value as to permit condenser 87 to be fully charged before any possible succeeding film deformation may be required. As a practical matter, it is unlikely that successive picture frames will be changed quicker than once every second or two seconds for sound reproduction at normal speed. By making the time constant of the combination of resistor 85 and condenser 87 about one-third or one-half second, satisfactory results may be obtained. It is preferred to have the duration and intensity of flash due to lamp 88 independent of the closure time of switch 29. Thus, the flash may have a duration of about one-thousandth of a second as one example, it being understood that the duration may be longer or shorter. Switch 29 may be a snap-acting type to provide a constant switch action.

The gear ratio between turntable 12 and sprockets 22 may be such that film 34 is moved past gate 89 at a comparatively slow speed, such as several inches per minute. At this speed, a quick intense flash from lamp 88 will result in a sharp spot in film. In general, however, the definition of the exposed region is of no importance.

Referring now to Figure 7, a circuit diagram of the system shown generally in Figure 6 is provided. Thus, terminal 90 is connected to the high side of a phonograph pick-up. Terminal 90 is connected to a ground terminal through resistor 91 forming part of a volume control. Resistor 91 has wiper 92 cooperating therewith, this wiper being connected by lead 93 to control grid 94 of amplifier 95a in tube 95. This amplifier has cathode 96 connected to ground through bias resistor 97 by-passed by condenser 98. This amplifier has anode 99 connected by lead 100 to junction 101. Junction 101 is connected through blocking condenser 102 to phone jack 103 and thence to control grid 104 of amplifier 105. Amplifier 105 has cathode 106 connected to ground through bias resistor 107 by-passed by condenser 108. Control grid 104 is connected to ground through grid resistor 110. Amplifier 105 has accelerating electrode 111 connected by lead 112 to junction 113. Lead 112 is connected through dropping resistor 114 back to junction 101.

Amplifier 105 has anode 116 connected through primary 117 of output transformer 118 to junction 119. Transformer 118 has secondary 120 going to speaker 26.

Junctions 113 and 119 are connected together through dropping resistor 122, and these two junctions are connected respectively to grounded filter condensers 123 and 124. Junction 119 is connected through resistor 125 and resistor 126 to lead 127 going to cathodes 128 of full-wave rectifier 129. Resistors 125 and 126 have their common junction connected to grounded filter condenser 130.

Rectifier 129 has heater filaments 131 connected to winding 132 of power supply transformer 133. Transformer 133 has filament winding 134 for energizing the filaments of tubes 95 and 105. Transformer 133 has high potential secondary 135 having center 136 grounded and the terminals connected to rectifier anodes 137 and 138 respectively. Transformer 133 has primary 140 connected to wires 141 and 142 for energization. Wire 141 has lead 143 branching from it and going to phonograph motor 66. Wire 142 is connected through main switch 145 to wire 146 of the main power line.

Referring now to amplifier 95b, there is provided cathode 148, control grid 149 and anode 150. Cathode 148 is connected to ground through bias resistor 151. Control grid 149 is connected to ground through grid resistor 152 and is also interconnected through blocking condenser 153 to junction 154. Junction 154 has condenser 155 connected between it and ground. Junction 154 is also connected through isolating resistor 157 to switch contact 158 adapted to play over a series of contacts 159 to 163 inclusive. These contacts are connected to a resistance network consisting of resistors 164 to 169 inclusive connected in series between wire 170 and ground. Wire 170 goes to junction 171 to which resistor 172 is connected. Resistor 172 is connected to condenser 173, this condenser itself being connected to junction 154.

Across condenser 173 is connected gas tube 175. In this particular instance, anode 176 is connected to resistor 172, while the cathode is connected to junction 154. Such tubes have the property of breaking down at a predetermined potential, and may be used as the active element of a relaxation type oscillator.

Anode 176 of gas tube 175 is connected by lead 178 to anode 150 of amplifier 95b. Anode 150 is connected through condenser 181 and resistor 182 to junction 183. Junction 183 is connected to ground through resistor 184 and is connected to wiper 92 through condenser 185.

Referring now to junction 171, lead 186 connects this junction to limit resistance 187 and thence to leads 188 and 127 going to cathode 128 of the rectifier. Grounded filter condenser 190 is connected to lead 188. Between lead 186 and ground, regulator tube 191 is connected. The connection is such that anode 192 is connected to lead 186 while cathode 193 is grounded.

Connected to junction 154 is lead 194 going to switch 29 (Figure 1). The other terminal of switch 29 is connected by lead 196 to movable contact 197 of a selector switch. Movable contact 197 cooperates with fixed contact 198 going to grounded lamp 200. Movable contact 197 is also adapted to cooperate with contact 201 going to grounded lamp 202. Mechanically tied to movable contact 197 is movable contact 204 connected by lead 205 to lead 142. Movable contact 204 cooperates in one position with fixed contact 206 connected by lead 207 to phonograph motor 66. Movable contact 204 has a dead position as indicated.

The operation of the switching portion of the system will first be described. Assume that movable contacts 197 and 204 are in the dotted line position. If main switch 145 is closed, it will be evident that the circuit to phonograph motor 66 will be open. In this condition, the system is then adjusted so that the phonograph pick-up needle is at the outermost groove of the record and the record is aligned preferably so that arrow 14 points toward the pick-up. It is assumed that unexposed film has been properly positioned in the device under dark room conditions and that a portion of the film is adjacent gate 24. The system is now in condition for starting operation. Switch 29 is pressed and causes lamp 202 to be flashed. This results in an image resulting in starting-deformation 35 being created on the film.

Contacts 197 and 204 are next thrown to the full-line position shown in Figure 7. In this position, the phonograph motor circuit is closed and causes the turntable to rotate. At the same time, film is fed at a constant rate past gate 24. Lamp 200 can now be flashed by switch 29 to create control deformations 40 on the film. It is assumed that an operator familiar with the desired synchronization will operate switch 29. Thus, it will be evident that the system is interlocked in such a manner that normal control deformations can be secured only when the phonograph turntable is rotating and when the film is moving.

The energy for flashing either of lamps 200 or 202 is obtained from condenser 155 which corresponds to condenser 87 in Figure 6. It is understood that switch 29 provides a closure time large in comparison to the flash time of the lamps. Resistor 157 and any one or more of the resistors in the network controlled by switch contact 158 corresponds to resistor 85 in Figure 6. Junction 171 may be considered as a source of constant potential for charging condenser 155.

Resistor 172, condenser 173 and gas tube 175 together form part of a relaxation oscillator circuit. Thus, current from junction 171 will flow through resistor 172 to anode 176 of the gas tube. Condenser 173 will be charged at the beginning of a relaxation cycle until the potential across the gas tube is sufficient to cause the tube to break down. The momentary discharge short-circuits condenser 173, and the potential across the gas tube drops to a low value. By proper choice of the value of resistor 172 and condenser 173, gas tube 175 may be made to oscillate at any desired frequency within the range at which such devices operate. Thus, as an example, a frequency of about 3000 cycles per second may be provided.

Anode 176 of gas tube 175 is connected by wire 178 to anode 150 of amplifier 95b. Under normal conditions, bias resistor 151 has a sufficiently low value so that amplifier 95b has substantial space current. By proper design, it is possible to have the potential difference between anode 150 and junction 154, under normal conditions, too low to break down gas tube 175. However, upon closure of switch 195 and discharge of condenser 155, the potential of junction 154 and the cathode of gas tube 175 is dropped to ground. This sudden drop of potential of junction 154 is communicated through blocking condenser 153 to control grid 149 of amplifier 95b. The negative pulse is sufficient to cut-off amplifier 95b. Thus, the potential at anode 150 and anode 176 rises and the potential at junction 154 and the cathode of tube 175 drops and permits the relaxation oscillator to function. The period of cut-off for amplifier 95b may be adjusted by controlling the time constant of condenser 153 and grid resistor 152. Preferably, this time constant may be so selected as to permit the relaxation oscillator to generate audible frequencies for a short period of time, such as a fraction of a second. Thus, if the relaxation oscillator generates a 3000 cycle wave for about one-fourth of a second, a definite and piercing note will be reproduced by the speaker. This is due to the connection from anode 176 of the relaxation oscillator through lead 178, blocking condenser 181 and resistor 182 to junction 183 and thence, through blocking condenser 185, to the input of audio frequency amplifier 95.

It will be noted that, if either lamp 200 or 202 is burned out, no exposure of the film becomes possible, and the operation of the relaxation oscillator is prevented. Thus, the operator can sense the condition of the system.

In the event that the operator desires to monitor the system through a head-phone in addition to the speaker, jack 103 may be used.

What is claimed is:

1. In an apparatus for deforming film at predetermined places on a narrow portion to function as a control track in the finished film for use in a synchronized sound reproducing and picture projection system, the combination of a sound reproducing system including means for moving a sound record during reproduction, means for moving unexposed film in timed relation to a sound record, a film gate cooperating with said narrow portion of said film, means including a light source and an electric switch for providing a constant exposure time on said film portion, said means including delay means for disabling said exposing means for a constant time immediately following an exposure, said disabling time being long in comparison to the exposure time, said switch having a manual control and having means for closing the switch contacts for a constant time longer than any exposure time upon manual switch operation, signal means to indicate an exposure and means controlled by said switch for energizing said indicating means when an exposure is made.

2. In a system of the character described, means for moving unexposed film strip at a constant rate, a film gate cooperating with a narrow portion to function as a control track on said finished film, a lamp for exposing said film at said gate, means for energizing said lamp for a fixed time interval, a manual switch for initiating an operating cycle for said energizing means, an audio frequency oscillator and sound reproducer, means for rendering said oscillator normally inoperative, means responsive to a change in the condition of said lamp for rendering said oscillator operative for a short period of time to energize said sound reproducer and give a warning signal whereby an operator may provide film deformations on said narrow portion.

3. In a system of the character described, means for moving an unexposed strip of film at a constant rate, a film gate cooperating with a narrow portion to function as a control track on said film after processing, a lamp for exposing said film at said gate, means including a manual switch for flashing said lamp for a predetermined constant time, a relaxation type oscillator for generating an audio frequency, sound reproducing means coupled to said oscillator and means responsive to an exposure cycle of said lamp for operating said relaxation oscillator for a brief interval of time.

4. In a system of the character described, means for moving unexposed strip film at a uniform rate, a pair of film gates cooperating with two parallel narrow portions to function as control tracks on said film after processing, a lamp for each film gate for exposing the film at a control track, switch means for rendering said film moving means operative, a circuit including an exposure switch for flashing a lamp, switch means interlocked with said first named switch for connecting one or other lamp in said circuit for flashing the lamp depending upon whether said film moving means is operating or not operating, whereby said last named switch will cause one lamp to flash when said film is stationary and will cause the other lamp to flash when said film is moving.

5. In a system of the character described, means for moving unexposed film at a uniform rate, a film gate cooperating with a narrow portion to function as a control track on said film after processing, a lamp for exposing the film through said gate, a condenser for storing electric energy, a circuit including an exposure switch for discharging said condenser through said lamp to flash the same, an audio frequency signal generator and a potential source for energizing said generator, connections between said potential source and said lamp flashing condenser, an electron discharge tube having a cathode, control grid and anode, means for connecting the anode and cathode across said generator, said tube when conducting serving to drain off enough current from said generator to disable the same, a resistance-condenser circuit between the control grid and said lamp flashing condenser, the potential across said lamp flashing condenser being impressed on said grid and causing said tube to conduct or cut off depending upon whether said condenser is charged or discharged respectively, and a speaker fed by said generator, said lamp flashing condenser when discharged cutting off said tube to initiate generator operation for operating the speaker, said resistance-condenser circuit having a time constant for causing said tube to conduct to disable said generator whereby when said lamp is flashed said speaker is energized for a predetermined time.

6. The system according to claim 5 wherein a sound reproducing system including means for moving a sound record in timed relation to said unexposed film is provided, said sound reproducing system utilizing said speaker, whereby synchronizing markings on a film may be provided at predetermined portions of reproduction from a related sound record.

7. In a system of the character described, means for moving a sound record and unexposed film in timed relation, a sound reproducing system including a speaker, a fine gate cooperating with a narrow portion to function as a control track on said film after processing, a lamp for exposing the film through said gate, a condenser for storing electric energy, a circuit including an exposure switch for discharging said condenser through said lamp to flash the same, an audio frequency generator of the relaxation oscillator type, an electron discharge tube having cathode, control grid and anode, means for connecting said generator and said lamp flashing condenser across the cathode and anode of said tube, a circuit including a condenser and resistor between the generator and control grid for causing said tube to conduct or cut off depending upon potential conditions across the lamp flashing condenser, a source of high potential connected to said lamp flashing condenser, generator and tube, said tube when conducting serving to drain sufficient current from across said generator to disable the same, and connections between said tube and the sound reproducing system for feeding said generator output thereto during the time that said tube is cut off whereby during sound reproduction an operator may operate the lamp flashing switch for discharging the condenser through said lamp, this serving to cut off said tube and initiate an operating cycle in said generator, said resistance-condenser circuit in the grid of said tube serving to restore said tube to a conducting condition for disabling the audio frequency generator.

MICHAEL C. SUPITILOV.
ROBERT H. LARSON.

REFERENCES CITED

The following references are of record in the file of this patent:

UNITED STATES PATENTS

| Number | Name | Date |
|---|---|---|
| 1,759,581 | Kwartin | May 20, 1930 |
| 1,888,910 | De Forest | Nov. 22, 1932 |
| 1,926,879 | Miller | Sept. 12, 1933 |
| 1,975,928 | Eldred | Oct. 9, 1934 |
| 2,022,665 | Halstead | Dec. 3, 1935 |
| 2,096,020 | Adair et al. | Oct. 19, 1937 |
| 2,153,211 | Spray | Apr. 4, 1939 |
| 2,379,505 | Watson | July 3, 1945 |